United States Patent [19]

Bartz

[11] Patent Number: 4,487,870

[45] Date of Patent: Dec. 11, 1984

[54] UV STABILIZER SYSTEM AND UV STABILIZED POLYOLEFINS

[75] Inventor: Kenneth W. Bartz, Baytown, Tex.

[73] Assignee: Exxon Research & Engineering Co., Florham Park, N.J.

[21] Appl. No.: 453,399

[22] Filed: Dec. 27, 1982

[51] Int. Cl.³ .............................. C08K 5/34; C08K 5/16
[52] U.S. Cl. .................................... 524/91; 524/99; 524/102; 524/198; 524/200; 524/524; 525/222
[58] Field of Search .................. 524/91, 99, 102, 198, 524/200, 524; 525/222

[56] References Cited

U.S. PATENT DOCUMENTS

| | | | |
|---|---|---|---|
| 3,422,055 | 1/1969 | Maloney | 525/222 |
| 4,021,432 | 5/1977 | Holt et al. | 524/99 |
| 4,232,132 | 11/1980 | Grigo et al. | 525/222 |

*Primary Examiner*—John Kight
*Assistant Examiner*—Kriellion Morgan
*Attorney, Agent, or Firm*—M. B. Kurtzman

[57] ABSTRACT

Polyolefins, in particular polypropylene, are stabilized against UV degradation by a system of ethylene vinyl acetate, containing at least 20% by weight vinyl acetate and one or more of a nickel or zinc-N,N'-dialkyldithiocarbamate or a piperidine derivative such as bis(2,2,6,6-tetramethyl-4-piperidyl)sebacate.

23 Claims, No Drawings

UV STABILIZER SYSTEM AND UV STABILIZED POLYOLEFINS

BACKGROUND OF THE INVENTION

1. Field of the Invention

The present invention relates to a stabilization formulation for stabilizing polyolefins from ultraviolet degradation and to the polyolefin compositions containing the formulation.

2. Related Art

High molecular weight polymers obtained by the polymerization of terminally unsaturated monoolefins, such as polyethylene, polypropylene, polybutene-1 and the like, have found wide and varied uses, replacing many conventional materials and creating new uses. Basically the polymers have many attractive physical properties that led to their initial acceptance, and by continuous search for compounding aids and additives these properties have been improved. For example, U.S. Pat. Nos. 3,361,852; 3,433,573 and 4,210,597 all disclose compounding polyolefins with ethylene vinyl acetate to obtain improved physical properties. However, the polymers are to varying degrees unstable in regard, for example, to oxidation and to ultraviolet radiation. Thus, stabilizer(s) are almost always added to polyolefins and blends thereof to provide protection against unwanted oxidation and ultraviolet degradation.

Polypropylene has especially desirable properties for outside applications, such as, a replacement for natural hemp in ropes and twine, however, polypropylene is particularly subject to ultraviolet light degradation. Many materials have been suggested and employed as UV stabilizers for polyolefins, such as hindered amines, benzophenones, benzotriazoles, salicylates, nickel dialkyldithiocarbamates and the like.

It has now been found that a formulation comprising specific known stabilizers in combination with a specific type of ethylene vinyl acetate copolymer provides surprising and synergistic stability for polyolefins against ultraviolet light degradation. Until the present invention, ethylene vinyl acetate copolymer, has not been considered in any regard as having significant effect on UV stability. Indeed, ethylene vinyl acetate copolymers have been employed with polyolefins primarily to improve impact strength and low temperature characteristics of the polyolefins.

It is an advantage of the present invention that the components of the UV stabilizing formulation have been used with the polyolefins and are generally compatible therewith, without detriment to other properties. It is a further advantage that the blending of the UV stabilizing system with the polyolefins is carried out by known and conventional equipment and methods. It is a feature that the polyolefin compositions containing the UV stabilizer system are superior in UV stability.

SUMMARY OF THE INVENTION

Briefly, the invention comprises a system for stabilizing polyolefins against ultraviolet light degradation, the polyolefin composition containing the system and the method of stabilizing polyolefins against UV light degradation.

The formulation for stabilizing said polyolefins against ultraviolet light degradation comprises a synergistic mixture of a minor amount of a UV stabilizer such as the benzophenones, benzotriazoles, the zinc and nickel organic UV light stabilizers such as zinc and nickel dibutyldithiocarbamate, and the like, the monobenzoates and hindered amines such as the piperidine derivatives having the general formula:

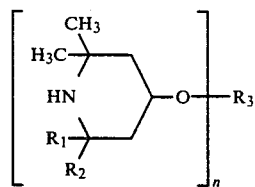

wherein
$R_1$ and $R_2$, which may be the same or different, are each an alkyl group, or form together with the carbon atom to which they are attached, a saturated alicyclic group with 5 to 7 ring carbon atoms or a group of the formula:

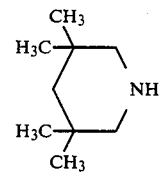

n is an integer of 1 to 3; and when n is 1, $R_3$ is an acyl group, an N-substituted carbamoyl group having as a substituent alkyl, cycloalkyl or aryl, an N-monosubstituted thiocarbamoyl group having as a substituent alkyl, cycloalkyl or aryl, a monovalent group obtained by removing a hydroxyl group from a sulfinic acid, a sulfonic acid, a phosphorus-containing acid or a boric acid, an alkyl group, a cycloalkyl group, an aralkyl group, an aryl group or a group of the general formula:

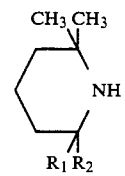

wherein $R_1$ and $R_2$ are as defined above,
when n is 2,
$R_3$ is a diacyl group, derived from a dibasic aliphatic or aromatic carboxylic acid, a dicarbamoyl group in which two carbamoyl groups are connected by an aryl, alkyl, diarylalkane or diaryl ether, a carbonyl group, a divalent group obtained by removing two hydroxyl groups from a disulfonic acid, a phosphorus-containing acid or a boric acid, an alkylene group, an arylene group or arylene dialkylene group, and
when n is 3,
$R_2$ is a triacyl group derived from an aromatic, cycloaliphatic or furane tricarboxylic acid, a tricarbamoyl group in which three carbamoyl groups are attached to one aryl group, a trivalent group obtained by removing three hydroxyl groups from a trisulfonic acid, a phosphorus-containing acid or a boric acid, alkanetriyl, an arenetriyl group or an arenetriyltrialkylene group; or a salt thereof with phosphoric acid, carbonic acid, citric acid, stearic acid or benzoic acid or mixtures thereof and a major amount of ethylene vinyl acetate, having at least 15 to about 50% by weight vinyl acetate and preferably 20 to about 30 by weight percent of vinyl acetate.

The ethylene vinyl acetate component of the present system, when employed in a polyolefin for UV stabilization of the olefin will comprise from about 5 to 20, preferably 8 to 16, weight percent of the total polymer composition and the UV light stabilizers listed above will comprise no more than 3 weight percent preferably about 0.6 to 1 weight percent of the total polymer composition.

DETAILED DESCRIPTION OF THE INVENTION

The ultraviolet light stabiliziers which can be usefully employed in combination with the ethylene vinyl acetate polymer to obtain the synergistic UV light stability are well known in the art. For example, the benzophenones such as:
2,4-dihydroxy-benzophenone,
2-hydroxy-4-acryloxyethoxy-benzophenone,
2-hydroxy-4-methoxy-benzophenone,
2,2'-dihydroxy-4-methoxy-benzophenone,
2,2'-dihydroxy-4,4'-dimethoxy-benzophenone,
2-hydroxy-4-n-octoxy-benzophenone,
2-hydroxy-4-isooctoxy-benzophenone,
2-2',4,4'-tetrahydroxy-benzophenone,
4-dodecyloxy-2-hydroxy-benzophenone,
5-chloro-2-hydroxy-benzophenone, disodium 2,2'-hydroxy-4,4'-dimethoxy-5,5'-disulfo-benzophenone, and the like;
benzotriazoles such as 2(2'-hydroxy-5'-methylphenyl)-benzotriazole,
2-3(3'5'-di-t-butyl-2'-hydroxyphenyl)-5-chlorobenzotriazole,
2-(3'-t-butyl-2'-hydroxy-5'-methylphenyl)-5-chlorobenzotriazole,
2-(2'-hydroxy-3',5'-di-t-butylphenyl)benzotriazole,
2(2'-hydroxy-3',5'-di-t-amylphenyl)benzotriazole,
2(2'-hydroxy-5-t-octylphenyl)benzotriazole;
the nickel and zinc organic UV light stabilizers such as nickel dibutyldithiocarbamate, nickel diisobutyldithiocarbamate, nickel dimethyldithiocarbamate; and the hindered amine light stabilizers such as for example the hindered amine light stabilizers represented by the general formula shown above such as for example:
4-acetoxy-2,2,6,6-tetramethylpiperidine;
4-stearoyloxy-2,2,6,6-tetramethylpiperidine;
4-acryloyloxy-2,2,6,6-tetramethylpiperidine;
4-(phenylacetoxy)-2,2,6,6-tetramethylpiperidine;
4-(phenoxyacetoxy)-2,2,6,6-tetramethylpiperidine;
4-cyclohexanoyloxy-2,2,6,6-tetramethylpiperidine;
4-benzoyloxy-2,2,6,6-tetramethylpiperidine;
4-(p-chlorobenzoyloxy)-2,2,6,6-tetramethylpiperidine;
4-(m-chlorobenzoyloxy)-2,2,6,6-tetramethylpiperidine;
4-(o-chlorobenzoyloxy)-2,2,6,6-tetramethylpiperidine;
4-(o-toluoyloxy)-2,2,6,6-tetramethylpiperidine;
4-isonicotinoyloxy-2,2,6,6-tetramethylpiperidine;
4-(2-furoyloxy)-2,2,6,6-tetramethylpiperidine;
4-($\beta$-naphthoyloxy)-2,2,6,6-tetramethylpiperidine;
4-methoxy-2,2,6,6-tetramethylpiperidine;
4-stearyloxy-2,2,6,6-tetramethylpiperidine;
4-cyclohexyloxy-2,2,6,6-tetramethylpiperidine;
4-benzyloxy-2,2,6,6-tetramethylpiperidine;
4-phenoxy-2,2,6,6-tetramethylpiperidine;
4-(ethylcarbamoyloxy)-2,2,6,6-tetramethylpiperidine;
4-(cyclohexylcarbamoyloxy)-2,2,6,6-tetramethylpiperidine;
4-(phenylcarbamoyloxy)-2,2,6,6-tetramethylpiperidine;
4-(p-chlorophenylcarbamoyloxy)-2,2,6,6-tetramethylpiperidine;
4-(o-tolylcarbamoyloxy)-2,2,6,6-tetramethylpiperidine;
4-($\alpha$-naphthylcarbamoyloxy)-2,2,6,6-tetramethylpiperidine;
4-(ethylthiocarbamoyloxy)-2,2,6,6-tetramethylpiperidine;
4-(cyclohexylthiocarbamoyloxy)-2,2,6,6-tetramethylpiperidine;
4-(phenylthiocarbamoyloxy)-2,2,6,6-tetramethylpiperidine;
4-benzensulfinyloxy-2,2,6,6-tetramethylpiperidine;
4-benzenesulfonyloxy-2,2,6,6-tetramethylpiperidine;
4-(p-toluensulfonyloxy)-2,2,6,6-tetramethylpiperidine;
4-(p-n-dodecylbenzenesulfonyloxy)-2,2,6,6-tetramethylpiperidine;
4-methanesulfonyloxy-2,2,6,6-tetramethylpiperidine;
bis(2,2,6,6-tetramethyl-4-piperidyl)carbonate;
bis(2,2,6,6-tetramethyl-4-piperidyl)oxalate;
bis(2,2,6,6-tetramethyl-4-piperidyl)malonate;
bis(2,2,6,6-tetramethyl-4-piperidyl)adipate;
bis(2,2,6,6-tetramethyl-4-piperidyl)fumarate;
bis(2,2,6,6-tetramethyl-4-piperidyl)sebacate;
bis(2,2,6,6-tetramethyl-4-piperidyl)hexahydroterephthalate;
bis(2,2,6,6-tetramethyl-4-piperidyl)terephthalate;
1,2-bis(2,2,6,6-tetramethyl-4-piperidyloxy)ethane;
$\alpha,\alpha'$-bis(2,2,6,6-tetramethyl-4-piperidyloxy)p-xylene;
bis(2,2,6,6-tetramethyl-4-piperidyl)tolylene-2,4-dicarbamate;
bis(2,2,6,6-tetramethyl-4-piperidyl)hexamethylene-1-6-dicarbamate;
bis(2,2,6,6-tetramethyl-4-piperidyl)diphenylmethane-p,p'-dicarbamate;
bis(2,2,6,6-tetramethyl-4-piperidyl)diphenyl-ether-p,p'-dicarbamate;
bis(2,2,6,6-tetramethyl-4-piperidyl)benzene-1,3-disulfonate;
bis(2,2,6,6-tetramethyl-4-piperidyl)phenyl-phosphite;
tris(2,2,6,6-tetramethyl-4-piperidyl)phosphite;
tris(2,2,6,6-tetramethyl-4-piperidyl)phosphate;
6-aza-7,7-dimethyl-9-benzoyloxy-spiro[4,5]decane;
1-aza-2,2-dimethyl-4-benzoyloxy-spiro[5,5]undecane;
1,9-diaza-4-benzoyloxy-2,2,8,8,10-10-hexamethylspiro[5,5]undecane;
1,9-diaza-4-(cyclohexylcarbamoyloxy)-2,2,8,8,10,10-hexamethylspiro[5,5]undecane;
bis(2,2,6,6-tetramethyl-4-piperidyl)ether;
tris(2,2,6,6-tetramethyl-4-piperidyl)-benzene-1,3,5-tricarboxylate; and
tris(2,2,6,6-tetramethyl-4-piperidyl)-benzene-1,3,4-tricarboxylate.

Preferably, the piperidine derivatives can be usefully employed in accordance with this invention are represented by the general formula above wherein $R_1$ and $R_2$ are each methyl, n is 2 and $R_3$ is a diacyl group derived from a dibasic aliphatic or aromatic carboxylic acid having from 1 to 24 carbon atoms and preferably 1 to 12 carbon atoms. Illustrative but nonlimiting examples of such piperidine derivatives are:
bis(2,2,6,6-tetramethyl-4-piperidyl)carbonate;
bis(2,2,6,6-tetramethyl-4-piperidyl)oxalate;
bis(2,2,6,6-tetramethyl-4-piperidyl)malonate;
bis(2,2,6,6-tetramethyl-4-piperidyl)adipate;
bis(2,2,6,6-tetramethyl-4-piperidyl)fumarate;

bis(2,2,6,6-tetramethyl-4-piperidyl)sebacate;
bis(2,2,6,6-tetramethyl-4-piperidyl)hexahydroterephthalate; and
bis(2,2,6,6-tetramethyl-4-piperidyl)terephthalate.

In a most preferred embodiment of this invention, the piperidine derivative is bis(2,2,6,6-tetramethyl-4-piperidyl)sebacate.

The preparation of the piperidine derivatives which may be usefully employed in accordance with this invention are well known and adequately described in U.S. Pat. No. 3,640,928, issued Feb. 10, 1972 which patent is hereby incorporated by reference in its entirety.

The polyolefins stabilizied by the formulation of the present invention are obtained by the polymerization of an olefin having the general formula $CH_2=CHR$, wherein R may be a hydrogen or hydrocarbon radical. The hydrocarbon radical may be aliphatic, cycloaliphatic or aromatic. They are high molecular weight polymers which have molecular weights, as determined by melt index, ranging from 0.01 to 500. Generally such polymers are prepared from monomers having less than 20 carbon atoms, preferably 2 to 8 carbon atoms, preferably R is H or a hydrocarbon radical having 1 to 6 carbon atoms. The polyolefins include comonomers of these olefins with one or more other monomers. Representative of examples of such polyolefins are low and high density polyethylene, polypropylene, polybutene-1, and copolymers or terpolymers thereof with other monomers such as ethylene with propylene, butene-1, octene-1, decene-1 and vinyl cyclohexene and propyiene with butene-1, octene-1, decene-1 and vinyl cyclohexene.

These polyolefins are generally obtained either through polymerization with a free radical catalyst, or through polymerization with an organometallic catalyst, referred to as a coordination catalyst.

The present system is of particular value when employed in polypropylene which has many excellent properties, but has until now achieved only limited use for outdoor products because of susceptibility to UV degradation.

The polypropylenes useful in the compositions of the present invention are normally solid polymers of propylene having a melt flow at 44 psi and 230° C. between 0.01 to 500 g/10 min. Although the density of the polypropylene is not critical, those having a density above about 0.89 g/cc are generally preferred. The polypropylene may be either amorphous or crystalline or partially crystalline. Polypropylene having a high degree of isotacticity as measured by hot heptane insolubles, e.g. 90% or more are generally preferred.

The ethylene vinyl acetate copolymers useful in the present invention preferably have a vinyl acetate content of from 15 to 70 weight percent vinyl acetate, preferably about 20 to 50 weight percent vinyl acetate. Melt indexes of these copolymers will have a range of 0.1 to 500, density of from 0.92 to 0.96 g/cc at 23° C. It should also be appreciated that the presence of ethylene vinyl acetate as a component of the present UV stabilizing system may impart improved impact and low temperature characteristics to the polymers. The preparation of ethylene vinyl acetate copolymers is described in "Vinyl and Related Compounds", C. E. Schildknecht, pages 531-3, John Wiley & Sons, Inc., N.Y., 1952.

The novel UV light stabilized polymeric compositions of this invention can also contain additives such as chemical additives, for example, antioxidants, fillers, pigments or reinforcements which are commonly used in plastic composition formulations and which will not materially interfer with the UV light stabilization process. For example, the compositions of this invention can contain additives and processing aids, viscosity modifiers, mold-release agents, emulsifiers and slip agents. The polymeric compositions of this invention can also contain antioxidants, anti-static agents which will not materially inhibit the UV stability of the composition. The compositions can also contain fillers such as for example, barium sulfate, calcium carbonate, calcium silicate, fumed silica, glass and clay. The polymeric compositions of this invention can also employ flame retardants, lubricants, plasticizers, adhesion promoters and stabilizers typically employed to prevent thermo-oxidative decomposition during for example high-temperature processing.

The components of the present formulation may be blended and handled as a package for incorporation into the polyolefins or may be individually blended into the polyolefin in any order using conventional hot processing equipment well known in the art. For example, batch type equipment such as a Banbury mixer or a two-roll mill can be employed or finely divided ground mixture can be compounmded in a screw extruder.

The polyolefin compositions of the present invention can be used to produce films, filaments, rods, protective coatings, molded and extruded shaped articles and the like.

The following examples are provided to illustrate the invention and are not intended to limit the scope thereof.

EXAMPLES

EXAMPLES 1-7

The following examples demonstrate the improved resistance of polypropylene containing the UV stabilizing system of the present invention. The same polymer (commercial product from same drier) was employed for each example. Dry blends of polypropylene powder and the additives indicated in the Table I were extruded as pellets on a 2" Prodlex extruder at 425° F. The pelletized blends from the extruder were converted into 2×100 mil ribbon yarns using the PLTD Ribbon Yarn Line equipped with a 2½" Prodex Extruder at Exxon Chemicals Plastic Research Facilities in Baytown, Texas.

Each of the extruded ribbon yarns was subjected to outdoor weathering in south Florida. The test consisted of exposing unstrained 2×100 mil ribbons directly and continuously to sunlight.

The initial tensile strength and % elongation were determined on each ribbon sample prior to outdoor weathering. Thereafter, beginning at six months and later at three month intervals, a sample was tested for tensile strength and % elongation (ASTM D-1708 and 1708, respectively) and the percent retention reported.

In addition to the ethylene vinyl acetate according to the present invention, a commercial LD-401 ethylene vinyl copolymer of low vinyl acetate was evaluated. This material had a vinyl acetate content of about 9 weight percent, MI of about 3.5 and density of 0.926.

| Test Components | |
|---|---|
| Designation | Description |
| PP | Powder, MFR, 3.7, Ti 3 ppm, Al, 14 ppm, |

-continued

| Designation | Test Components Description |
|---|---|
| | Cl, 6 ppm, BHT, 460 ppm |
| A | Ethylene vinyl acetate, about 25% vinyl acetate - Elvax 360- product of DuPont, MI, 1.7-2.3, % VA of 24.3-25.7 Den, .950 |
| B | Ethylene vinyl acetate, about 9% vinyl acetate, product of EXXON Chemical Company, USA, MI 3.5, VA 9%, Den 0.926 |
| NBC | Ni—N,N'—dibutyldithiocarbamate. product of Dupont |
| 1010 | Tetrakis[methylene 3-(3',5'-di-tert-butyl-4 hydroxyphenyl) propionate] methane, product of Ciba Geigy Corp. |
| DSTP | Distearylthiodipropionate, product of American Cyanamid Company, Argus Chemical, etc. |
| 770 | Decanedioic acid, di-4(2,2,6,6-tetra-methyl piperidinyl)ester - Tinuvin 770, product of Ciba Geigy Company |
| D.P. | Monostral green G, product of E. I. Dupont |
| AMP | Ampacet Microlith GK Green, product of Ampacet |
| BHT | 2,6-ditertiary butyl paracresol |
| W-618 | Distearylpentaerythritol diphosphite, product of Borg Warner |

EXAMPLES 8-17

A second set of yarns produced from the same polypropylene was evaluated in the same outdoor test in South Florida. The compositions and results are set out in Table II and III. All of the polypropylene contained 10 wt% of A.

These samples were also subjected to laboratory testing using the Xenon Weatherometer test for 3500 hours. This standard test involves exposing the ribbon yarns in a standard Xenon Weatherometer according to ASTM methods.

The results are in general accordance with the outdoor testing, however, the outdoor testing is considered to be a more reliable indication of the UV stability of the present polypropylene compositions in actual use.

EXAMPLES 18-21

These examples clearly demonstrate the synergistic effect of employing ethylene vinyl acetate and UV light stabilizer in combination to obtain improved UV light stability. A third set of 2×100 mill yarns produced from the same polypropylene was evaluated in the same outdoor test in South Florida. The compositions and results are set out in Table IV.

TABLE I

| | | Weight % Additives | | | | | | So. Florida (Months) | | | | | | | | | | | | | |
| | | | | | | | | % Tensile Ret. | | | | | | | % Elong. Ret. | | | | | | |
| EX | Denier | A | B | NBC | 1010 | DSTP | 770 | 6 | 12 | 15 | 18 | 21 | 24 | 27 | 6 | 12 | 15 | 18 | 21 | 24 | 27 |
|---|---|---|---|---|---|---|---|---|---|---|---|---|---|---|---|---|---|---|---|---|---|
| 1 | 1279 | 5 | | 1.0 | .05 | .15 | | 100 | 93 | 79 | 53 | 40 | 0 | | 83 | 80 | 71 | 55 | 52 | 0 | |
| 2 | 1230 | 10 | | 1.0 | .05 | .15 | | 105 | 98 | 96 | 95 | 90 | 86 | 71 | 91 | 89 | 87 | 84 | 75 | 87 | 63 |
| 3 | 1230 | 20 | | 1.0 | .05 | .15 | | 98 | 92 | 90 | 81 | 80 | 69 | 62 | 97 | 90 | 88 | 80 | 80 | 65 | 71 |
| 4 | 1164 | | 5 | 1.0 | .05 | .15 | | 97 | 89 | 0 | | | | | 83 | 76 | 0 | | | | |
| 5 | 1180 | | 10 | 1.0 | .05 | .15 | | 99 | 90 | 0 | | | | | 88 | 85 | 0 | | | | |
| 6 | 1213 | | 20 | 1.0 | .05 | .15 | | 102 | 91 | 0 | | | | | 85 | 79 | 0 | | | | |
| 7 | 1129 | 10 | | | .10 | .15 | .50 | 99 | 86 | 78 | 70 | 65 | 59 | 52 | 80 | 77 | 59 | 51 | 46 | 43 | 36 |

[1]Descriptions of the additives are reported above

TABLE II

| | | Weight % Additives | | | | | | | | So. Florida (Months) | | | | | | | | | | | |
| | | | | | | | | | | % Tensile Ret. | | | | | | % Elong. Ret. | | | | | |
| EX | Denier | NBC | 770 | 618 | 1010 | DSTP | DP | AMP | BHT | 6 | 12 | 16 | 22 | 25 | 28 | 6 | 12 | 16 | 22 | 25 | 28 |
|---|---|---|---|---|---|---|---|---|---|---|---|---|---|---|---|---|---|---|---|---|---|
| 8 | 1082 | 1.0 | | | .05 | .15 | | | | 92 | 90 | 89 | 70 | 64 | 31 | 98 | 95 | 93 | 79 | 67 | 51 |
| 9 | 1049 | | .70 | | .05 | | | | | 91 | 87 | 87 | 92 | 91 | 85 | 96 | 80 | 79 | 90 | 84 | 82 |
| 10 | 1016 | | .70 | | .05 | | .10 | | | 91 | 89 | 87 | 90 | 82 | 91 | 92 | 90 | 80 | 78 | 80 | 85 |
| 11 | 1033 | | .70 | | .05 | | .30 | | | 96 | 94 | 94 | 95 | 93 | 89 | 88 | 87 | 80 | 83 | 78 | 73 |
| 12 | 902 | | .70 | | .05 | | .60 | | | 92 | 91 | 90 | 89 | 86 | 81 | 88 | 87 | 83 | 78 | 66 | 63 |
| 13 | 1016 | | .70 | | .05 | | | .60 | | 89 | 88 | 86 | 91 | 91 | 90 | 85 | 84 | 84 | 86 | 78 | 82 |
| 14 | 918 | | .70 | .10 | .05 | | .10 | | | 91 | 90 | 90 | 92 | 93 | 92 | 79 | 77 | 76 | 79 | 76 | 78 |
| 15 | 1033 | | .25 | .10 | | | | | .10 | 91 | 90 | 89 | 89 | 82 | 87 | 87 | 86 | 82 | 85 | 90 | 85 |
| 16 | 1033 | | .50 | .10 | | | | .60 | .10 | 90 | 83 | 82 | 91 | 92 | 87 | 87 | 83 | 82 | 89 | 82 | 92 |
| 17 | 951 | | .50 | .10 | | .10 | | | .10 | 93 | 86 | 86 | 91 | 95 | 87 | 83 | 79 | 77 | 71 | 75 | 68 |

[1]All samples contain 10 wt % of additive A, Additive descriptions are reported above

TABLE III

| | XENON WEATHEROMETER EXPOSURE (Hours)[1] | | | | | | | | | | | | | |
| | % Tensile Retention | | | | | | | % Elongation Retention | | | | | | |
| Sample | 500 | 1000 | 1500 | 2000 | 2500 | 3000 | 3500 | 500 | 1000 | 1500 | 2000 | 2500 | 3000 | 3500 |
|---|---|---|---|---|---|---|---|---|---|---|---|---|---|---|
| Ex. 8 | 99 | 99 | 97 | 95 | 93 | 90 | 89 | 98 | 97 | 95 | 95 | 50 | 50 | 48 |
| Ex. 9 | 97 | 94 | 92 | 90 | 88 | 86 | 76 | 99 | 92 | 90 | 87 | 53 | 50 | 49 |
| Ex. 10 | 99 | 99 | 98 | 97 | 68 | 56 | 0 | 95 | 94 | 94 | 82 | 45 | 40 | 0 |
| Ex. 11 | 90 | 90 | 89 | 83 | 72 | 35 | 0 | 80 | 79 | 76 | 64 | 49 | 34 | 0 |
| Ex. 12 | 98 | 96 | 95 | 86 | 63 | 30 | 0 | 86 | 84 | 83 | 60 | 40 | 31 | 0 |
| Ex. 13 | 100 | 98 | 98 | 97 | 89 | 64 | 39 | 90 | 90 | 88 | 86 | 53 | 50 | 34 |
| Ex. 14 | 100 | 99 | 99 | 97 | 90 | 77 | 51 | 83 | 82 | 80 | 77 | 57 | 53 | 44 |
| Ex. 15 | 97 | 81 | 78 | 62 | 43 | 29 | 0 | 96 | 84 | 78 | 76 | 26 | 20 | 0 |
| Ex. 16 | 100 | 99 | 97 | 93 | 83 | 73 | 57 | 93 | 92 | 84 | 72 | 50 | 45 | 40 |

TABLE III-continued

| | XENON WEATHEROMETER EXPOSURE (Hours)[1] | | | | | | | | | | | | | |
|---|---|---|---|---|---|---|---|---|---|---|---|---|---|---|
| | % Tensile Retention | | | | | | | % Elongation Retention | | | | | | |
| Sample | 500 | 1000 | 1500 | 2000 | 2500 | 3000 | 3500 | 500 | 1000 | 1500 | 2000 | 2500 | 3000 | 3500 |
| Ex. 17 | 97 | 94 | 93 | 92 | 64 | 61 | 25 | 82 | 81 | 80 | 76 | 41 | 39 | 19 |

[1]See Table II for sample identifications

TABLE IV

| | Wt % Additive | | | | % Elongation Retention, After So. Florida Exposures, Months | | | | |
|---|---|---|---|---|---|---|---|---|---|
| | NBC | 1010 | DSTP | 770 | A | 6 | 12 | 18 | 24 | 27 |
| 18 | 1.0 | 0.5 | .15 | — | — | 76 | 70 | 0 | 0 | 0 |
| 19 | 1.0 | .05 | .15 | — | 10 | 91 | 89 | 84 | 76 | 63 |
| 20 | — | .10 | — | .50 | — | 54 | 42 | 0 | 0 | 0 |
| 21 | — | .10 | | .50 | 10 | 80 | 77 | 51 | 43 | 36 |

The invention claimed is:

1. A formulation for stabilizing polyolefins against ultraviolet light degradation comprising a mixture of (a) a minor amount of a UV light stabilizer and (b) a major amount of ethylene vinyl acetate containing at least 15% by weight vinyl acetate.

2. The formulation according to claim 1 wherein said ethylene vinyl acetate contains 15 to 70% by weight vinyl acetate.

3. The formulation according to claim 2 wherein said ethylene vinyl acetate contains 20 to 50% by weight vinyl acetate.

4. The formulation according to claim 1 wherein (a) is selected from the group consisting of benzophenones, benzotriazoles, salicylates, nickel and zinc dialkyldithiocarbamates and hindered light amines represented by the general formula:

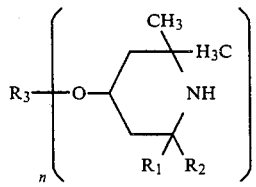

wherein $R_1$ and $R_2$, which may be the same or different, are each an alkyl group, of form together with the carbon atom to which they are attached, a saturated alicyclic group with 5 to 7 ring carbon atoms or a group of the formula:

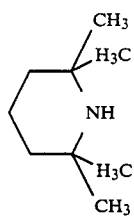

n is an integer of 1 to 3; and when n is 1, $R_3$ is an acyl group, an N-substituted carbamoyl group having a substituent alkyl, cycloalkyl or aryl, an N-monosubstituted thiocarbamoyl group having a substituent alkyl, cycloalkyl or aryl, a monovalent group obtained by removing a hydroxyl group from a sulfinic acid, a sulfonic acid, a phosphorous-containing acid or a boric acid, an alkyl group, a cycloalkyl group, an aralkyl group, an aryl group or a group of the general formula:

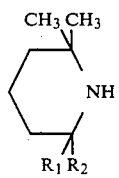

wherein $R_1$ and $R_2$ are as defined above, when n is 2, $R_3$ is a diacyl group, derived from a dibasic aliphatic or aromatic carboxylic acid, a dicarbamoyl group in which two carbamoyl groups are connected by an aryl, alkyl, diarylalkane or diaryl ether, a carbonyl group, a divalent group obtained by removing two hydroxyl groups from a disulfonic acid, a phosphorous-containing acid or a boric acid, an alkylene group, an arylene group or arylene dialkylene group, and when n is 3, $R_2$ is a triacyl group derived from an aromatic, cycloaliphatic or furane tricarboxylic acid, a tricarbamoyl group in which three carbamoyl groups are attached to one aryl group, a trivalent group obtained by removing three hydroxyl groups from a trisulfonic acid, a phosphorous-containing acid or a boric acid, alkanetriyl, an arenetriyl group or an arenetriyltrialkylene group; or a salt thereof with phosphoric acid, carbonic acid, citric acid, stearic acid or benzoic acid and mixtures thereof.

5. The formulation according to claim 4 wherein (a) is selected from the group consisting of
bis(2,2,6,6-tetramethyl-4-piperidyl)carbonate,
bis(2,2,6,6-tetramethyl-4-piperidyl)oxalate,
bis(2,2,6,6-tetramethyl-4-piperidyl)malonate,
bis(2,2,6,6-tetramethyl-4-piperidyl)adipate,
bis(2,2,6,6-tetramethyl-4-piperidyl)fumarate,
bis(2,2,6,6-tetramethyl-4-piperidyl)sebacate,
bis(2,2,6,6-tetramethyl-4-piperidyl)hexahydroterephthalate and
bis(2,2,6,6-tetramethyl-4-piperidyl)terephthalate,
nickel-N,N'-dibutyldithiocarbamate,
nickel-N-N'-diisobutyldithiocarbamate and
nickel-N,N'-dimethyldithiocarbamate.

6. The formulation according to claim 5 wherein (a) is one of nickel-N,N'-dibutyldithiocarbamate and bis(2,2,6,6-tetramethyl-4-piperidyl)sebacate.

7. A polyolefin composition comprising a high molecular weight polyolefin and a UV stabilizing amount of a formulation comprising mixture of (a) a minor amount of a UV light stabilizer or mixtures thereof and (b) a major amount of ethylene vinyl acetate containing at least 15% by weight vinyl acetate.

8. The polyolefin composition according to claim 7 wherein said polyolefin is the product of the polymerization of monomers of the formula $CH_2=CHR$, wherein R is a hydrogen or hydrocarbon radical.

9. The polyolefin composition according to claim 8 wherein R is hydrogen or a hydrocarbon radical having 1 to 6 carbon atoms.

10. The polyolefin composition according to claim 7 wherein said polyolefin is polypropylene.

11. The polyolefin composition according to claim 7 comprising from about 5 to about 20 weight percent ethylene vinyl acetate, based on the total composition.

12. The polyolefin composition according to claim 11 wherein the polyolefin is polypropylene.

13. The polyolefin composition according to claim 12 comprising from about 8 to about 16 weight percent of ethylene vinyl acetate.

14. The polyolefin composition according to claim 12 wherein (a) is selected from the group consisting of benzophenones, benzotriazoles, salicylates, nickel and zinc dialkyldithiocarbamates and hindered light amines represented by the general formula:

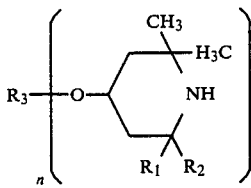

wherein $R_1$ and $R_2$, which may be the same or different, are each an alkyl group, or form together with the carbon atom to which they are attached, a saturated alicyclic group with 5 to 7 ring carbon atoms or a group of the formula:

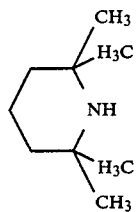

n is an integer of 1 to 3; and when n is 1, $R_3$ is an acyl group, an N-substituted carbamoyl group having a substituent alkyl, cycloalkyl or aryl, an N-monosubstituted thiocarbamoyl group having a substituent alkyl, cycloalkyl or aryl, a monovalent group obtained by removing a hydroxyl group from a sulfinic acid, a sulfonic acid, a phosphorous-containing acid or a boric acid, an alkyl group, a cycloalkyl group, an aralkyl group, an aryl group or a group of the general formula:

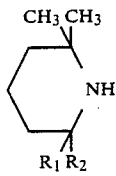

wherein
$R_1$ and $R_2$ are as defined above,
when n is 2,
$R_3$ is a diacyl group, derived from a dibasic aliphatic or aromatic carboxylic acid, a dicarbamoyl group in which two carbamoyl groups are connected by an aryl, alkyl, diarylalkane or diaryl ether, a carbonyl group, a divalent group obtained by removing two hydroxyl groups from a disulfonic acid, a phosphorous-containing acid or a boric acid, an alkylene group, an arylene group or arylene dialkylene group, and when n is 3,
$R_2$ is a triacyl group derived from an aromatic, cycloaliphatic or furane tricarboxylic acid, a tricarbamoyl group in which three carbamoyl groups are attached to one aryl group, a trivalent group obtained by removing three hydroxyl groups from a trisulfonic acid, a phosphorous-containing acid or a boric acid, alkanetriyl, an arenetriyl group or an arenetriyl-trialkylene group; or a salt thereof with phosphoric acid, carbonic acid, citric acid, stearic acid or benzoic acid and mixtures thereof.

15. The polyolefin composition according to claim 14 wherein (a) is selected from the group consisting of
bis(2,2,6,6-tetramethyl-4-piperidyl)carbonate,
bis(2,2,6,6-tetramethyl-4-piperidyl)oxalate,
bis(2,2,6,6-tetramethyl-4-piperidyl)malonate,
bis(2,2,6,6-tetramethyl-4-piperidyl)adipate,
bis(2,2,6,6-tetramethyl-4-piperidyl)fumarate,
bis(2,2,6,6-tetramethyl-4-piperidyl)sebacate,
bis(2,2,6,6-tetramethyl-4-piperidyl)hexahydroterephthalate and
bis(2,2,6,6-tetramethyl-4-piperidyl)terephthalate,
nickel-N,N'-dibutyldithiocarbamate,
nickel-N-N'-diisobutyldithiocarbamate and
nickel-N,N'-dimethyldithiocarbamate.

16. The method of stabilizing polyolefins against ultraviolet light degradation comprising intimately dispersing through a polyolefin a UV stabilizing amount of a system comprising a mixture of (a) a minor amount of a UV light stabilizer and (b) a major amount of ethylene vinyl acetate containing at least 15% by weight vinyl acetate.

17. The method according to claim 16 wherein said polyolefin is polypropylene.

18. The method according to claim 17 wherein from about 5 to 20 weight percent ethylene vinyl acetate based on the total weight of composition is present.

19. The method according to claim 18 wherein (a) is a mixture.

20. The fomulation according to claim 5 wherein (a) is one of nickel-N,N'-dibutyldithiocarbamate, nickel-N,N'-diisobutyldithiocarbamate and nickel-N,N'-dimethyldithiocarbamate.

21. The formulation according to claim 6 wherein (a) is bis(2,2,6,6-tetramethyl-4-piperidyl)sebacate.

22. The polyolefin composition according to claim 15 wherein (a) is one of
nickel-N,N'-dibutyldithiocarbamate,
nickel-N,N'-diisobutyldithiocarbamate and
nickel-N,N'-dimethyldithiocarbamate.

23. The polyolefin composition according to claim 15 wherein (a) is bis(2,2,6,6-tetramethyl-4-piperidyl)sebacate.

* * * * *